April 22, 1969 R. M. STITS 3,439,890
FOLDING WING AIRPLANE
Filed May 15, 1967 Sheet 1 of 4
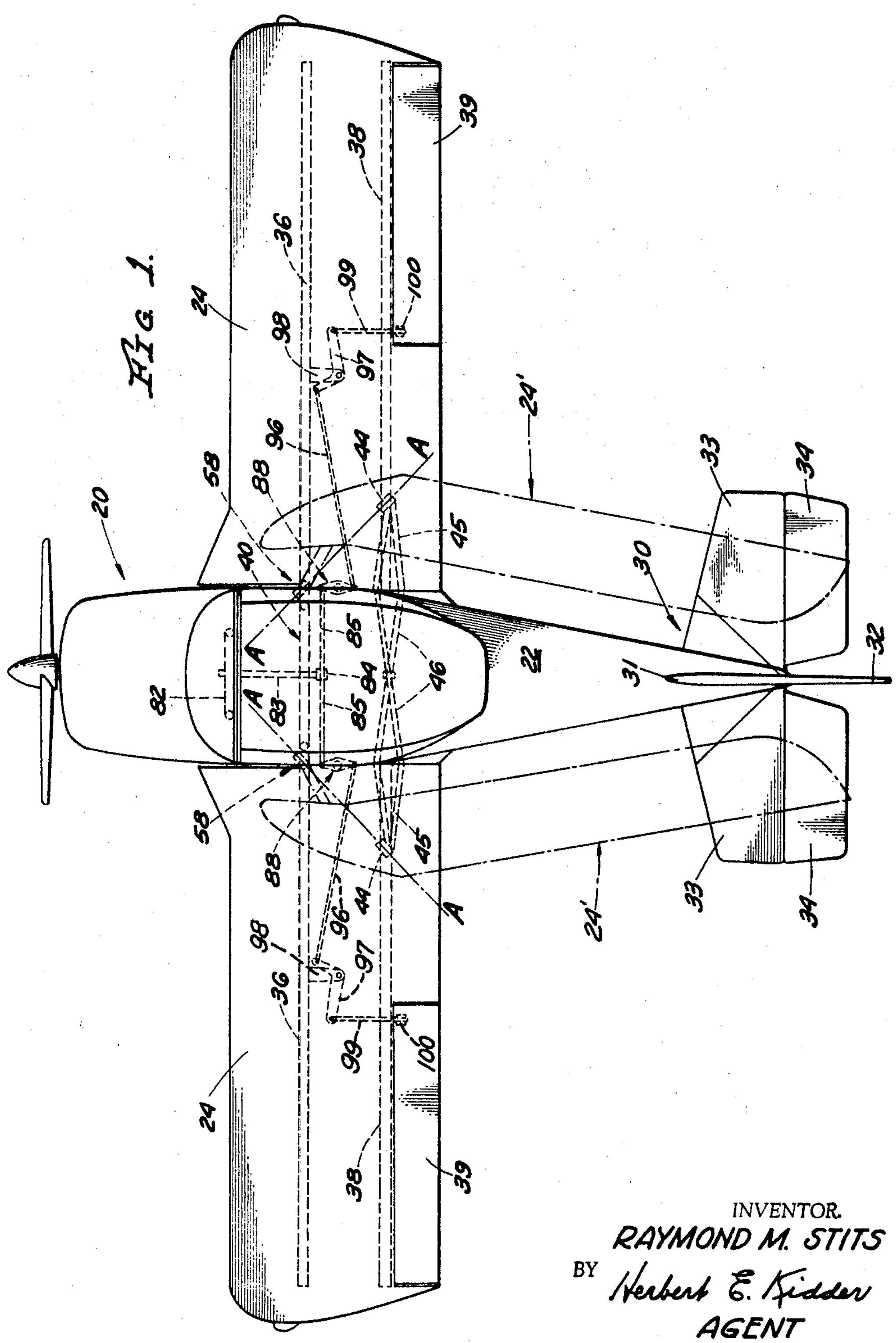
INVENTOR.
RAYMOND M. STITS
BY Herbert E. Kidder
AGENT

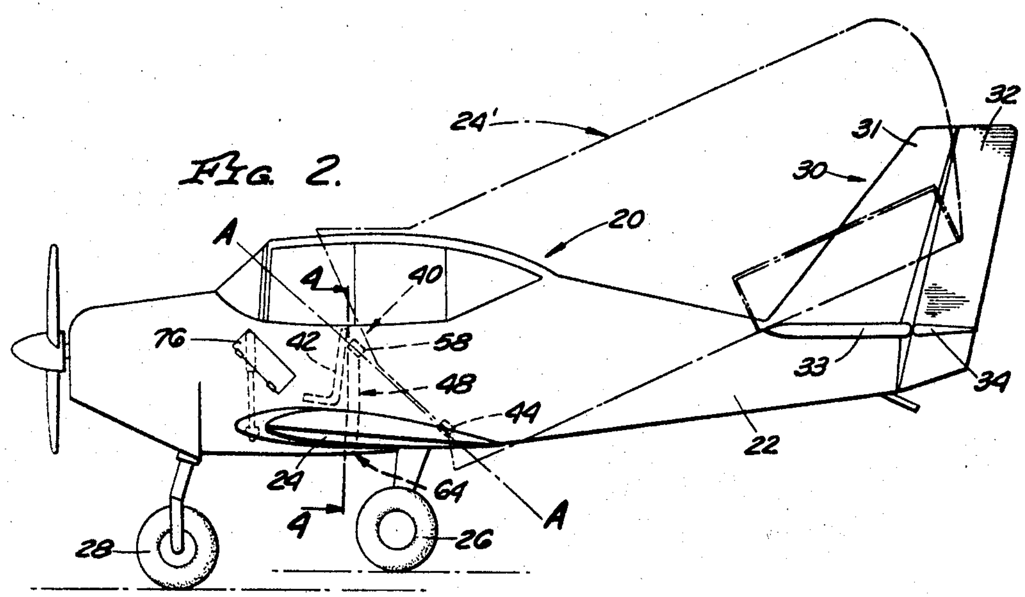
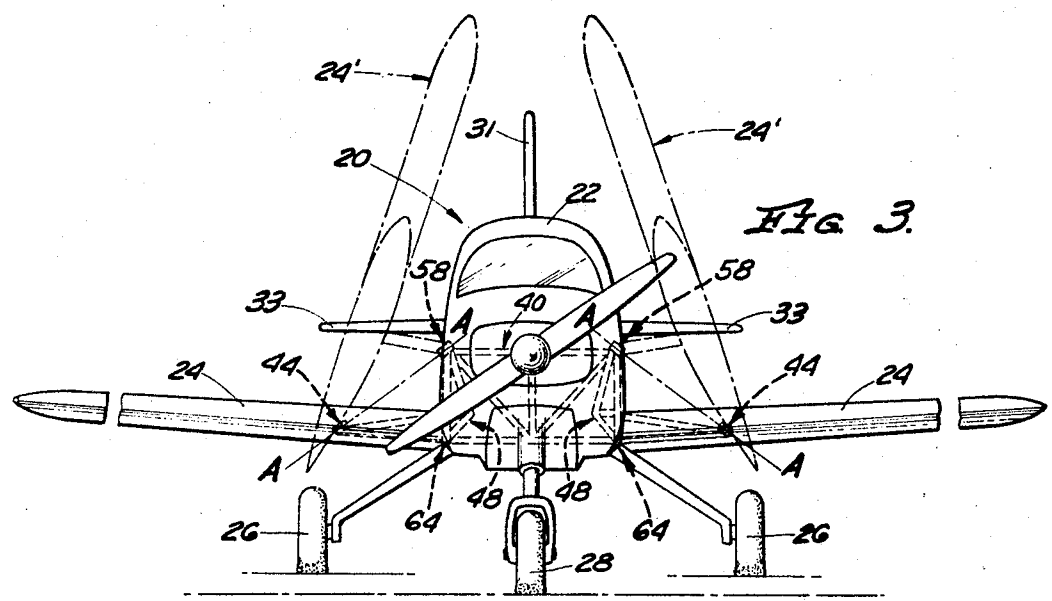
INVENTOR.
RAYMOND M. STITS
BY Herbert E. Kidder
AGENT

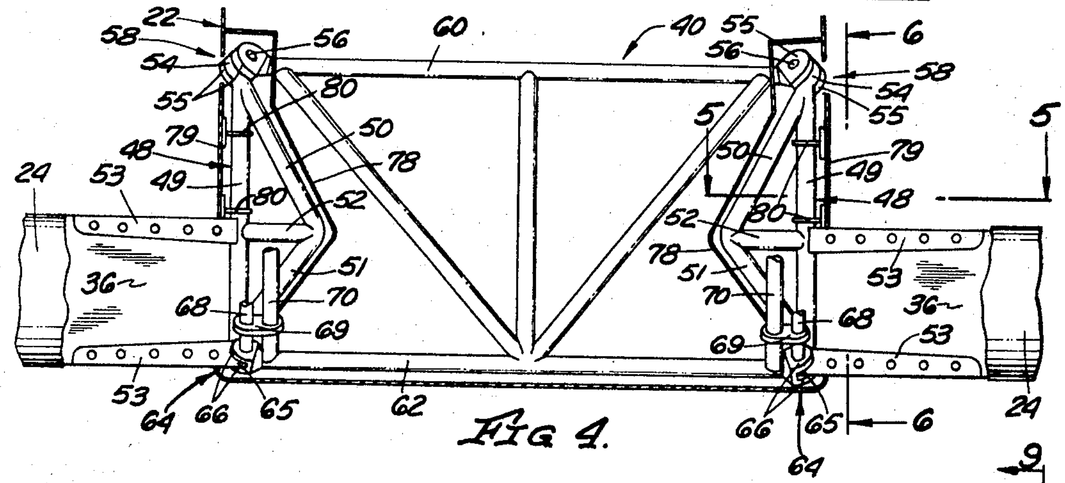
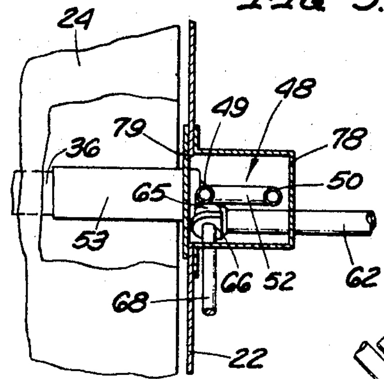
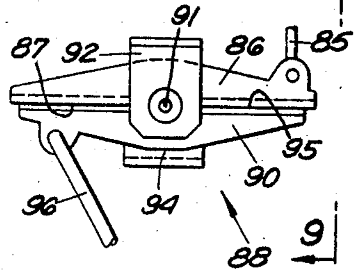
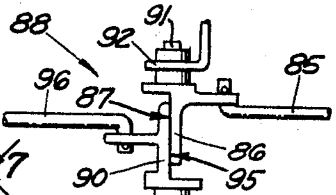
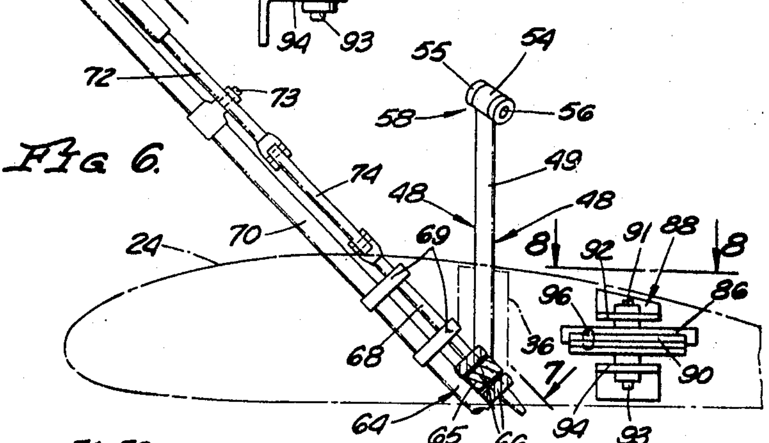
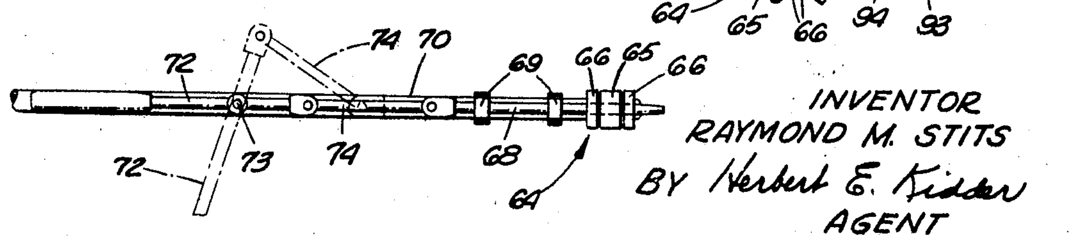
INVENTOR
RAYMOND M. STITS
BY Herbert E. Kidder
AGENT FOLDING WING AIRPLANE
Filed May 15, 1967
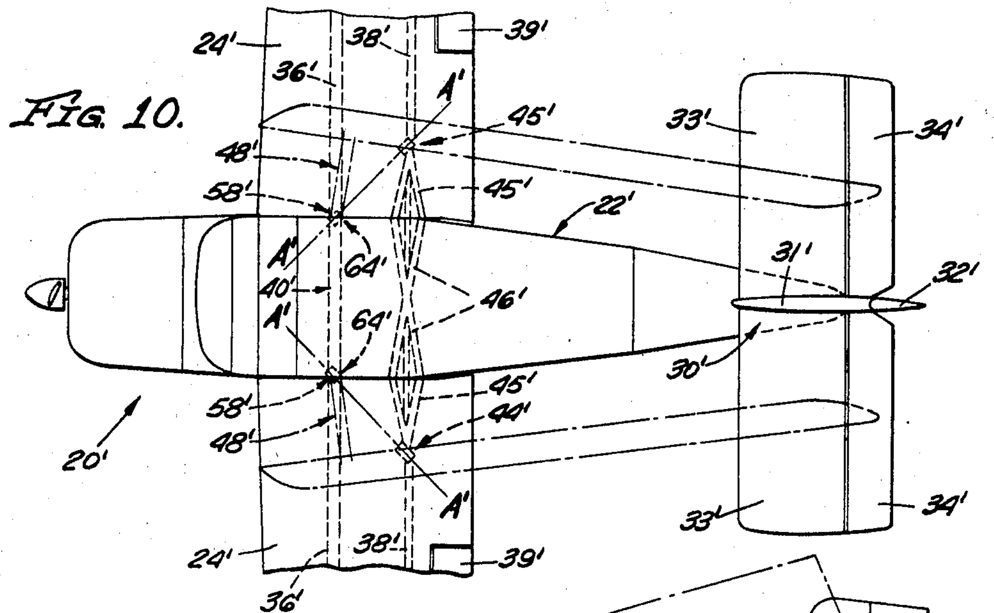
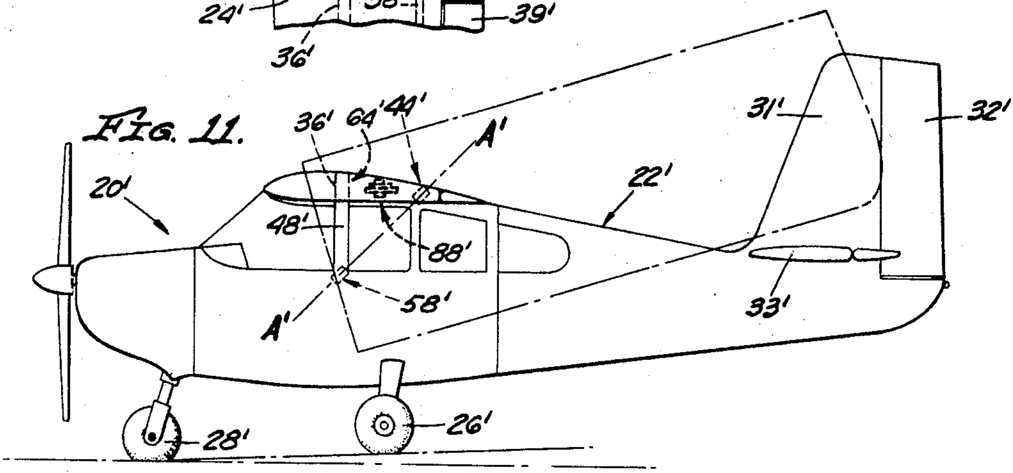
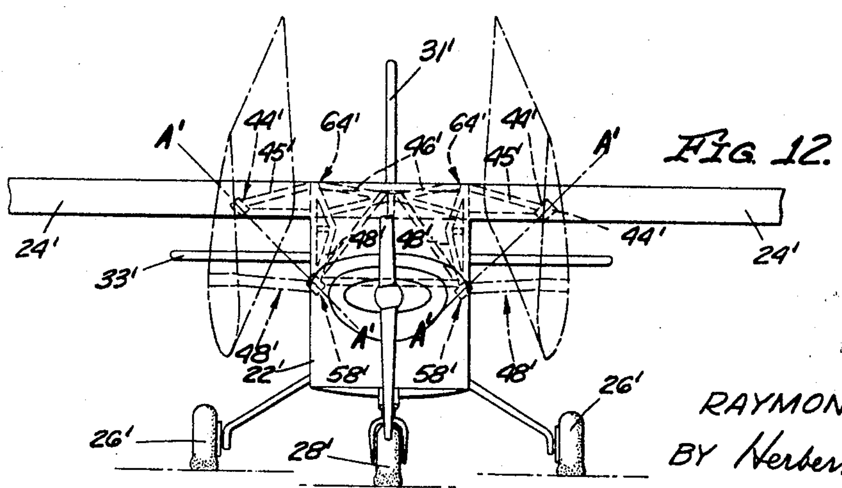
INVENTOR
RAYMOND M. STITS
BY Herbert E. Kidder
AGENT United States Patent Office 3,439,890

Patented Apr. 22, 1969

3,439,890
FOLDING WING AIRPLANE

Raymond M. Stits, P.O. Box 3084,
Riverside, Calif. 92509

Filed May 15, 1967, Ser. No. 638,330
Int. Cl. B64c 3/56
U.S. Cl. 244—49 9 Claims

ABSTRACT OF THE DISCLOSURE

A full-cantilever-wing airplane, having wings that fold back and simultaneously turn, so as to lie alongside the fuselage with their chords generally vertical. An arm projects vertically from the root end of the main wing beam to a pivot on the fuselage spaced vertically from the wing. A second, outboard pivot is mounted on a supporting structure projecting laterally from the fuselage behind the main beam. Releasable locks connect the root ends of the main wing beams to the fuselage, and a structural member carries the compressive and tensile stresses of the wing beam transversely through the fuselage. The ailerons are joins to the controls in the fuselage by separable couplings, which become operatively connected as the wing moves to the flight position.

BACKGROUND OF THE INVENTION

The invention relates to folding wing airplanes, and more specifically to a folding wing airplane of the type having full-cantilever wings, with no wing struts. In particular, the invention has to do with a novel structural arrangement whereby a full-cantilever wing can be made to fold rearwardly about an axis inclined to the transverse, vertical, and longitudinal axes of the airplane, so that the wing not only lies alongside the fuselage but also is turned so that its chord is substantially vertical.

The reason for folding the wings of an airplane is, of course, to reduce its overall width for storage purposes, and/or for transport on the highway. Since hangar storage charges represent one of the major expenses of owning an airplane, the ideal arrangement would be a folding wing airplane that can be stored in the garage alongside the family car, and which can be towed on a trailer, by the car, to and from the airport or landing strip. Ideally, the airplane should, when its wings are folded, be no wider than 8 feet, which is the maximum width allowed on the highway without special permit. The overall height of the airplane with the wings folded should also be low enough to enable the airplane to pass under roof overhangs or other obstructions extending over driveways.

Various attempts have been made in the past to develop a folding wing airplane, but most of these have been deficient in one respect or another. In some cases, good folding wing geometry has been achieved, but at the expense of considerable assembly and disassembly work, involving critical structural connections with attendant danger of structural failure in flight due to improperly connected members. In other cases, the folding geometry has been such that an overall width of 8 feet or less could not be achieved, or else the height was excessive. The only type of airplane which has thus far been susceptible of being used as a folding wing airplane is the strut-braced monoplane, with either high or low wing. However, as airspeeds increase, there is an increasing tendency to eliminate struts in favor of full-cantilever wings because of their cleaner aerodynamic design.

While folding wing airplanes of full-cantilever wing construction have been used for many years in carrier-based naval aircraft, the construction inherently heavy, and far too expensive for adaptation to airplanes designed for private flying. To the best of my knowledge, there has never been a private airplane having a full-cantilever wing that could be folded back alongside the fuselage with the chord substantially vertical, thereby reducing the overall width to 8 feet or less, and the overall height to 10 feet or less, in which the change from folded-wing to flying configuration, or vice versa, could be accomplished in only a few minutes without the use of any tools, and in which the structural integrity of the airplane could not possibly be jeopardized.

SUMMARY OF THE INVENTION

The primary object of the invention is to provide a simple, inexpensive and lightweight folding wing airplane of full-cantilever wing construction, wherein the wing is folded back to lie alongside the fuselage, with the chord substantially vertical; which can be changed from folded-wing to flying configuration by one man in only a few minutes, without tools of any kind; which can be designed to have an overall width of not more than 8 feet in an airplane of up to four passengers or more, with an overall height of not more than 10 feet; which is structurally sound, and cannot have its integrity compromised by inadvertence or incompetence when converting from folded-wing to flying configuration; and in which the ailerons connect automatically to the control stick, without requiring any attention on the part of the operator.

The above object is achieved by a unique construction, wherein the wings are hinged to opposite sides of the fuselage for swinging movement about forwardly and upwardly converging axes (in the case of a low-wing airplane), or forwardly and downwardly converging axes (in the case of a high-wing airplane). In order to accomplish this folding geometry in a full-cantilever wing. I provide an arm attached to the root end of the main wing beam, which extends vertically and is connected at its distal end by a first pivot to a structural member on the fuselage. Projecting laterally outward from the fuselage to the rear of the main beam is a support member having a second pivot on its outer end, to which the wing is connected. The axes of the first and second pivots are aligned, and are inclined to the three axes of the airplane, as described above. A locking device is provided for locking the main wing beam to the fuselage at the edge opposite the said arm, and a structural truss on the fuselage frame transfer the wing load stresses from each of the pivots on one side to the corresponding pivot on the other side, and from one locking device to the other. Means is also provided for automatically coupling the aileron-actuating mechanisms of each wing to the control stick in the fuselage, as the wing is swung into place for flight.

DESCRIPTION OF THE DRAWINGS

FIGURE 1 is a top plan view of a low-wing airplane embodying the invention, the wings being shown in solid lines as they appear when extended for flight, and in phantom lines as they appear when folded;

FIGURE 2 is a side elevation of the same;

FIGURE 3 is a front elevation;

FIGURE 4 is an enlarged fragmentary sectional view, taken at 4—4 in FIG. 2;

FIGURE 5 is a fragmentary sectional view, taken at 5—5 in FIG. 4;

FIGURE 6 is a fragmentary sectional view, taken at 6—6 in FIG. 4, showing the locking device and aileron control coupling;

FIGURE 7 is another view of the locking device, taken at 7—7 in FIG. 6;

FIGURE 8 is an enlarged sectional view of the aileron control coupling, taken at 8—8 in FIG. 6;

FIGURE 9 is a sectional view, taken at 9—9 in FIG. 8;

FIGURE 10 is a top plan view of a high-wing airplane embodying the invention;

FIGURE 11 is a side elevational view of the same; and FIGURE 12 is a front elevation.

DESCRIPTION OF A PREFERRED EMBODIMENT

The low-wing embodiment of the present invention shown in FIGURES 1 to 9, inclusive, comprises a four-place, low-wing airplane 20, comprising a fuselage 22 having full-cantilever wings 24, which fold back as shown in phantom lines at 24'. The airplane 20 has a pair of main wheels 26 and a nose wheel 28. At the rear end of the fuselage is the empennage 30, comprising a vertical stabilizer 31 to which a rudder 32 is swingably connected. Projecting laterally from opposite sides of the fuselage below the vertical stabilizer 31 are horizontal stabilizers 33, to which elevators 34 are hinged.

The wings 24 may be constructed in any conventional manner and are herein shown as comprising a main beam 36, which extends laterally from the fuselage to the outer tip end of the wing. A short distance to the rear of the main beam is a parallel rear beam 38, the outer end portion of which provides support for the hinges connecting the ailerons 39 to the trailing edges of the wings. The wings 24 are constructed with the usual ribs and bracing (not shown), and may be covered with fabric or sheet metal skin.

The root ends of the main beam 36 are connected to opposite ends of a transverse truss structure 40, which extends across the fuselage 22 directly behind the front seat 42, as shown in FIG. 2. Each of the rear beams 38 terminates at either end a short distance out from the fuselage side, and is attached by a hinge pivot 44 to the outer end of a laterally projecting tripod extension 45 forming part of a tubular steel truss structure 46, which is formed integrally with the tubular steel framework of the fuselage. The hinge pivot 44 is located substantially at the top surface of the wing 24, and the axes of the pivots 44 converge forwardly in an upwardly-and-forwardly inclined plane, as shown by dot-dash lines A—A.

The main beams 36 each have an upwardly extending arm 48 fixed to the root end thereof, which may be formed as a solid forging of high-tensile strength steel or aluminum alloy, or it may be built up as a welded tubular truss, as shown in FIG. 4, comprising members 49, 50, 51 and 52. The root end of the main beam 36 is connected to the lower end portion of the arm 48 by means of two tangs 53, which are welded to the truss member 49 and project laterally therefrom. The top end of arm 48 is formed with a hinge barrel 54 which is received between a pair of hinge members 55 and connected thereto by a hinge pin 56; the complete assembly forming a hinge pivot designated in its entirety by the reference numeral 58. The hinge members 55 are welded to the outer ends of the top transverse member 60 of truss 40, and they are located substantially at the surface of the fuselage skin. The axis of the hinge pivot 58 lies on an extension of the axis of its corresponding hinge pivot 44, and the wing 24 is thus able to swing upwardly and rearwardly about the inclined axis A—A, causing the wing to fold back alongside the fuselage, with the chord of the wing extending generally perpendicular to the ground.

From the above, it will be seen that the top edges of the main wing beams 36 are cross-connected through the fuselage by means of the arms 48 and top transverse member 60 of truss 40. In like manner, the bottom edges of the beams are cross-connected by means of a bottom transverse member 62 of truss 40, to which the bottom ends of arms 48 are connected by releasable locking means 64. The locking means 64 preferably comprises a barrel 65 formed integrally with the bottom end of arm 48 at the junction of members 49 and 51, and this barrel passes between spaced members 66 welded to opposite ends of member 62, to which it is connected by a retractable shear pin 68.

Shear pin 68 is slidably supported in guides 69 welded to the top side of an inclined tubular fuselage frame member 70, which extends generally parallel to the plane formed by converging axes A—A. The bottom end of shear pin 68 is tapered and passes through aligned holes in members 65, 66. The shear pin is adapted to be retracted from said members 65, 66, so as to release the bottom end of arm 48 to allow the wing to be folded back to the position shown at 24'. Retraction of shear pin 68 is accomplished by means of a lever arm 72, which is pivoted at 73 on the frame member 70. The bottom end of lever arm 72 is connected by a link 74 to the top end of shear pin 68, and when the lever arm 72 is swung down to the position shown in phantom lines in FIG. 7, the shear pin is retracted from the members 65, 66. A hinged access door 76 (see FIG. 2) is provided in the side of the fuselage directly alongside lever arm 72, and this can be swung down to enable the pilot to get at the lever arm. A friction detent may be provided, if desired, to hold the lever arm 72 in a slightly over-center position, making it impossible for the shear pin to work its way out of the members 65, 66 while the airplane is in flight.

As best shown in FIGS. 4 and 5, the arm 48 retracts into the side of the fuselage 22, where it is out of the airstream. The arm 48 is preferably confined within a channel-shaped housing 78 of sheet metal which is closed on the outside by a flat cover plate 79, that is secured by brackets 80 to the outer side of member 49.

The rudder 32, elevators 34, and ailerons 39 are operated by means of a dual stick control 82 mounted on the front end of a fore-and-aft extending shaft 83. The shaft 83 is supported for rotation so that it can turn when the control stick 82 is moved toward one side or the other for the purpose of operating the ailerons. Fixed to the rear end of shaft 83 is a downwardly projecting arm 84, which is connected by links 85 to members 86 forming part of two separable couplings 88, which connect the control stick to the operating mechanism of the ailerons 39. The separable couplings 88 are located in the vertical planes where the wing roots abut against the sides of the fuselage 22, and are preferably positioned between the main wing beam 36 and the rear beam 38.

Each of the couplings 88 comprises two members 86 and 90, which are pivoted intermediate their ends for turning about a common vertical axis when the wing is extended in the flight condition. Member 86 is pivoted at 91 on the underside of a laterally projecting horizontal bracket 92 that is fixed to a suitable frame member on the fuselage. The outer face 87 of member 86 lies in a plane passing through the axis of pivot 91, as shown in FIGS. 8 and 9. Member 90 is likewise pivoted at 93 on the top side of a horizontal bracket 94 attached to the wing and projecting laterally inwardly therefrom. The outer face 95 of member 90 also lies in a plane passing through the axis of pivot 93, but faces in the opposite direction to the outer face 87 of member 86. When the wing is swung down to the flight condition, the face 95 of member 90 contacts the face 87 of member 86, and the two members 86 and 90 are thereafter constrained to rotate as one about a common axis passing through the pivots 91 and 93.

One end of coupling member 90 is connected by a link 96 to one arm of a bell crank 97, which is pivotally supported on a bracket 98 mounted on the back side of main wing beam 36. The other arm of bell crank 97 has a link 99 connected thereto, which extends rearwardly through an opening in the underside of the wing, to connect with an arm 100 projecting downwardly from the underside of aileron 39. Thus, when the control stick 82 is moved to the right of center, the right-hand aileron 39 is swung upwardly by the clockwise rotation of its bell crank 97, while the left-hand aileron 39 is swung downwardly by counterclockwise rotation of its bell crank 97.

When the wings are folded back for transport, the wing tips pass over the tops of the horizontal stabilizers 33 and preferably secured to the vertical stabilizer 31 on opposite sides thereof. I also find it desirable to connect a spring to the linkage of the aileron-actuating mechanism, so that when the wings are folded back, the ailerons 39 are both turned inwardly, and are prevented from swinging freely on their hinges.

The overall width of the airplane with its wings folded can be reduced to a maximum of 8 feet in a four passenger air plane of the type shown, making it possible to tow the airplane over public highways on a trailer behind an automobile, without the necessity of getting a special license or permit. Also, with these dimensions, the airplane can be stored in any garage or parking area having at least 8 feet of width and a vertical clearance of about 10 feet. The airplane can be tilted back on its main wheels 26 to get under the average 7-foot high garage door, by pushing the tail assembly downwardly while wheeling the airplane into the garage. The chief advantage of my invention is that it provides an aerodynamically clean airplane having a full-cantilever wing, without the usual struts, in which the wings can be folded back to lie alongside the fuselage, giving an overall width of the order of 8 feet, whereby the airplane can be towed to the owner's home and stored in the garage.

FIGURES 10, 11 and 12 show my invention embodied in a high-wing airplane. In this embodiment, parts that are identical to their counterparts in the low-wing version of FIGS. 1–3, have been given the same reference numerals, with prime (′) suffixed added. Thus, the airplane 20′ comprises a fuselage 22′ with empennage 30′, wings 24′, and landing gear wheels 26′ and 28′. The high wing 24′ also has a main beam 36′ and a rear beam 38′, and each wing is connected to the fuselage by hinge pivots 44′ and 58′, the latter being carried at the end of an arm 48′ which is rigidly secured to the root end of the main beam 36′. The chief difference between this embodiment and the low-wing version is that the axes of the hinge pivots 44′, 58′ converge forwardly in a downwardly and forwardly inclined plane, and the arms 48′ project downwardly, instead of upwardly as in FIGS. 1–4. Otherwise, their construction is the same. Releasable locking means (indicated at 64′, but not shown in detail) is provided in order to lock the wing in the extended flight position, and separable couplings 88′, similar to the aileron control couplings of the preceding embodiment, are also used. The releasable locking means 64′ connects the top edge of the main wing beam 36′ to the top member of a transverse truss 40′ (or other load carrying structure, such as a bulkhead, for example) in the fuselage, while the bottom member of the truss connects the hinge pivots 58′ together. The hinge pivots 58′ and arms 48′ constitute extensions of the bottom edge of the main wing beam. Thus, the tensile and compressive stresses of the wing beams 36′ are carried through the fuselage from one wing to the other through the truss 40′.

I claim:

1. In a full-cantilever-wing airplane having a fuselage, a pair of wings projecting laterally from opposite sides thereof, and a tail section, the improvement comprising:

hinge means joining each of said wings to said fuselage, whereby the wings may be folded back alongside said fuselage, with the chord of the wing disposed generally perpendicular to the ground;

said hinge means including front and rear hinge pivots spaced apart from one another along the longitudinal axis of said fuselage;

said hinge pivots having aligned pivot axes about which the wing folds, and the pivot axes of both of said wings converging forwardly in a plane inclined in the fore-and-aft direction;

said front hinge pivot being spaced vertically from one side of said wing closely adjacent the outer surface of the fuselage side wall;

said rear hinge pivot being spaced laterally outward from said fuselage side wall closely adjacent the surface of said one of side of said wing;

an arm fixed to the root end of each of said wings and extending vertically from said one side thereof, the distal end of said arm being connected to said front hinge pivot;

said arm being retracted out of the airstream when said wing is extended in the flight condition;

a structural member fixed to said fuselage on each side thereof and projecting laterally therefrom between the top and bottom boundaries of said wings, the outer ends of said members being connected to said rear hinge pivots;

releasable locking means for connecting the root ends of each of said wings to said fuselage adjacent the other side of the wing substantially opposite said arm; and means for transmitting the tensile and compressive stresses of the wings transversely through said fuselage from said front and rear hinge pivots and said locking means of one wing to their counterparts on the other wing.

2. The invention of claim 1, wherein said airplane is a low-wing airplane;

said first hinge pivot being spaced upwardly from the top side of said wing, and the folding axes of said wings converging forwardly in a plane inclined upwardly in the forward direction; and each of said arms extending upwardly from the root end of its associated wing.

3. The invention of claim 1, wherein said airplane is a high-wing airplane;

said front hinge pivot being spaced downwardly from the bottom side of said wing, and the folding axes of said wings converging forwardly in a plane inclined downwardly in the forward direction; and each of said arms extending downwardly from the root end of its associated wing.

4. The invention of claim 1, wherein said means for transmitting stresses through said fuselage includes a transverse structure having top and bottom sides, one of said sides being connected at its ends to said front hinge pivot of each of said wings, and the other of said sides being connected at its ends to said releasable locking means of each of said wings.

5. The invention of claim 1, wherein each of said airplane wings has a main beam extending for substantially the entire span of the wing, said beams having vertically spaced top and bottom edges, said arm being attached to the root end of said main beam and extending vertically from one of said edges, and said releasable locking means being connected to the root end of said main beam at the other edge thereof.

6. The invention of claim 2, wherein each of said airplane wings has a main beam extending for substantially the entire span of the wing, each of said arms being fixed to the root end of said main beam, and extending upwardly from the top edge thereof, and said releasable locking means being connected to the root end of said beam at the bottom edge thereof.

7. The invention of claim 3, wherein each of said airplane wings has a main beam extending for substantially the entire span of the wing, each of said arms being fixed to the root end of said main beam and extending downwardly from the bottom edge thereof, and said releasable locking means being connected to the root end of said beam at the top edge thereof.

8. The invention of claim 1, wherein each of said airplane wings has a main beam extending for substantially the entire span of the wing, said main beam having top and bottom edges;

each of said arms being fixed to the root end of said main beam and extending vertically from one edge thereof;

said releasable locking means being connected to the root end of said beam at the other edge thereof; and said means for transmitting stresses through said fuselage includes a transverse truss having a top side and a bottom side, one of said sides being connected at its ends to said front hinge pivot of each of said wings, and the other of said sides being connected at its ends to said releasable locking means of each of said wings.

9. The invention of claim 1, wherein said wings are movable between a laterally extended flight position and a folded transport position, each of said wings having an aileron hinged to its trailing edge, and force-transmitting means connected to said aileron to actuate the same, and said fuselage having an aileron control;

a separable coupling operatively connecting said aileron control to said force-transmitting means when said wing is in said flight position;

said coupling comprising a first member pivoted on said fuselage for turning about a first pivot axis, said first member being operatively connected to said aileron control whereby it is turned about said first pivot axis when said aileron control is moved; and a second coupling member pivoted on said wing at the root end thereof for turning about a second pivot axis, said second member being operatively connected to said force-transmitting means, whereby said aileron is moved when said second member is turned;

said first and second members being juxtaposed and bearing against one another, and said first and second pivot axes being aligned with respect to one another when said wing is extended in said flight position; and said first and second members turning as one about a common axis when said wing is in said flight position, whereby movement of said aileron control causes a corresponding movement of said aileron.

References Cited

UNITED STATES PATENTS

| | | | |
|---|---|---|---|
| 1,723,962 | 8/1929 | Weymouth | 244—49 |
| 1,481,400 | 1/1924 | Weinberg. | |
| 1,556,414 | 10/1925 | Bumpus. | |
| 1,757,109 | 5/1930 | Boyd. | |

FOREIGN PATENTS

| | | |
|---|---|---|
| 444,354 | 8/1912 | France. |
| 106,533 | 2/1939 | Great Britain. |

MILTON BUCHLER, *Primary Examiner.*

R. A. DORNON, *Assistant Examiner.*